United States Patent
Jia

(10) Patent No.: US 12,125,287 B2
(45) Date of Patent: Oct. 22, 2024

(54) DETECTING OBSTACLE

(71) Applicant: APOLLO INTELLIGENT CONNECTIVITY (BEIJING) TECHNOLOGY CO., LTD., Beijing (CN)

(72) Inventor: Jinrang Jia, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 372 days.

(21) Appl. No.: 17/560,246

(22) Filed: Dec. 22, 2021

(65) Prior Publication Data

US 2022/0114813 A1    Apr. 14, 2022

(30) Foreign Application Priority Data

Dec. 25, 2020   (CN) .......................... 202011558835.0

(51) Int. Cl.
*G06V 20/00* (2022.01)
*G06T 7/269* (2017.01)
(Continued)

(52) U.S. Cl.
CPC .............. *G06V 20/54* (2022.01); *G06T 7/269* (2017.01); *G06T 7/70* (2017.01); *G06V 10/761* (2022.01); *G06V 2201/08* (2022.01)

(58) Field of Classification Search
CPC .. G06V 20/54; G06V 10/761; G06V 2201/08; G06V 10/751; G06V 20/58;
(Continued)

(56) References Cited

U.S. PATENT DOCUMENTS 6,487,303 B1   11/2002   Yamaguchi et al.
2006/0013438 A1*   1/2006   Kubota .................. G06V 20/58
                                                          382/103
(Continued)

FOREIGN PATENT DOCUMENTS

CN         101441076 A         5/2009
CN         108682038 A        10/2018
(Continued)

OTHER PUBLICATIONS

Wekel et al, Vision Based Obstacle Detection for Wheeled Robots, International Conference on Control, Automation and Systems, pp. 1587-1592 (Year: 2008).*
(Continued)

*Primary Examiner* — Ping Y Hsieh
*Assistant Examiner* — Xiao Liu
(74) *Attorney, Agent, or Firm* — Leydig, Voit & Mayer, Ltd.

(57) ABSTRACT

A method for detecting an obstacle, an electronic device, a roadside device and a cloud control platform are provided and relates to the fields of automatic drive and intelligent traffic. The method includes acquiring a current image, wherein the current image includes an obstacle object representing an obstacle located on a predetermined plane; determining a transformation parameter between the current image and a template image based on current coordinates of a plurality of reference points on the predetermined plane in the current image and template coordinates of corresponding reference points for the plurality of reference points in the template image; and determining a position of the obstacle in a world coordinate system utilizing the transformation parameter and pixel coordinates of the obstacle object in the current image.

16 Claims, 8 Drawing Sheets

(51) Int. Cl.
*G06T 7/70* (2017.01)
*G06V 10/74* (2022.01)
*G06V 20/54* (2022.01)

(58) Field of Classification Search
CPC .......... G06V 2201/07; G06V 30/19007; G06T 7/269; G06T 7/70; G06N 20/00; G06F 18/22
See application file for complete search history.

(56) References Cited

U.S. PATENT DOCUMENTS

| | | | | |
|---|---|---|---|---|
| 2009/0167844 | A1* | 7/2009 | Seki | H04N 7/181 |
| | | | | 348/47 |
| 2011/0091131 | A1 | 4/2011 | Price et al. | |
| 2016/0093052 | A1 | 3/2016 | Yu et al. | |
| 2018/0024562 | A1 | 1/2018 | Bellaiche | |

FOREIGN PATENT DOCUMENTS

| | | | | |
|---|---|---|---|---|
| CN | 108830257 A | | 11/2018 | |
| CN | 110146869 A | | 8/2019 | |
| CN | 110213488 A | | 9/2019 | |
| CN | 110717457 A | | 1/2020 | |
| CN | 110728720 A | | 1/2020 | |
| CN | 111046762 A | * | 4/2020 | ......... G06K 9/00711 |
| CN | 111578839 A | | 8/2020 | |
| CN | 111612760 A | | 9/2020 | |
| CN | 111754580 A | | 10/2020 | |
| CN | 111767843 A | | 10/2020 | |
| CN | 111998772 A | | 11/2020 | |
| EP | 3633539 A2 | | 4/2020 | |
| EP | 3846129 A2 | | 7/2021 | |
| JP | 2001319218 A | | 11/2001 | |
| JP | 2005182504 A | | 7/2005 | |
| JP | 2008197917 A | | 8/2008 | |
| JP | 2009020800 A | | 1/2009 | |
| JP | 2010103877 A | | 5/2010 | |
| JP | 2010287153 A | | 12/2010 | |
| JP | 2012146199 A | | 8/2012 | |
| JP | 2013061773 A | * | 4/2013 | |
| JP | 2015111339 A | | 6/2015 | |
| JP | 6227211 B1 | | 11/2017 | |
| JP | 2020013293 A | | 1/2020 | |
| JP | 2020187385 A | | 11/2020 | |
| KR | 10-2015-0002273 A | | 1/2015 | |

OTHER PUBLICATIONS

Ichimura, Naoyuki "Feature Point Tracking Based on Feature Point Extraction in Every Frame," Information Technology Research Institute, Ibaraki, Japan (Nov. 8, 2001).

Zhou et al., "Optical flow-based optimization method of vehicle motion estimation," Chang'an University, Xi'an, China, pp. 65-69 (2016).

Wang et al., "Research on Obstacle Avoidance of Robot Based on Monocular Vision," National University of Defense Technology, Changshua, China, Zhejiang Sci-Tech University, Hangzhou, China, pp. 56-64 (2018).

Yang et al., "An Optical Flow-based Obstacle Estimation Algorithm," Ninjing University of Science and Technology, Ninjing, China, pp. 80-81 (May 2006).

* cited by examiner

DETECTING OBSTACLE

CROSS-REFERENCE TO RELATED APPLICATIONS

This application claims priority to Chinese Patent Application No. 202011558835.0, filed on Dec. 25, 2020, the contents of which are hereby incorporated by reference in their entirety for all purposes.

TECHNICAL FIELD

The present disclosure relates to the field of automatic drive and intelligent traffic, and specifically relates to a method and apparatus for detecting an obstacle, an electronic device, a roadside device, a cloud control platform, a computer-readable storage medium and a computer program product.

BACKGROUND

In order to realize the detection of an obstacle on a road, a roadside sensing device is generally mounted on a relatively high position, such as a traffic light pole, a monitoring pole or other device poles. Due to the complexity of a realistic environment, it is possible to cause the shake of the position of the roadside sensing device when it is affected by an external environment.

SUMMARY

The present disclosure provides a method and apparatus for detecting an obstacle, an electronic device, a roadside device, a cloud control platform, a computer-readable storage medium and a computer program product.

According to one aspect of the present disclosure, provided is a method for detecting an obstacle. The method includes: acquiring a current image, wherein the current image includes at least one obstacle object representing at least one obstacle located on a predetermined plane; determining a transformation parameter between the current image and a template image based on current coordinates of a plurality of reference points on the predetermined plane in the current image and template coordinates of corresponding reference points for the plurality of reference points in the template image; and determining a position of the obstacle in a world coordinate system by utilizing the transformation parameter and pixel coordinates of the obstacle object in the current image.

According to another aspect of the present disclosure, provided is an apparatus for detecting an obstacle. The apparatus includes: an image acquiring unit, configured to acquire a current image, wherein the current image includes at least one obstacle object representing at least one obstacle located on a predetermined plane; a transformation determining unit, configured to determine a transformation parameter between the current image and a template image based on current coordinates of a plurality of reference points on the predetermined plane in the current image and template coordinates of corresponding reference points for the plurality of reference points in the template image; and an obstacle position determining unit, configured to determine a position of the obstacle in a world coordinate system by utilizing the transformation parameter and pixel coordinates of the obstacle object in the current image.

According to another aspect of the present disclosure, provided is an electronic device, including: at least one processor; and a memory in communication connection with the at least one processor; wherein the memory stores an instruction executable for the at least one processor, and the instruction is executed by the at least one processor, so that the at least one processor is enabled to execute the method as mentioned previously.

According to another aspect of the present disclosure, provided is a roadside device, including the electronic device as mentioned previously.

According to another aspect of the present disclosure, provided is a cloud control platform, including the electronic device as mentioned previously.

According to another aspect of the present disclosure, provided is a non-transitory computer-readable storage medium storing a computer instruction, wherein the computer instruction is used to enable a computer to execute the method as mentioned previously.

According to another aspect of the present disclosure, provided is a computer program product, including a computer program, wherein when the computer program is executed by a processor, the method as mentioned previously is implemented.

According to one or more embodiments of the present disclosure, obstacle detection precision decrease caused by change of external parameters of an image acquiring device can be conveniently corrected by utilizing transformation of a plurality of reference points in an image.

It should be understood that the contents described in this part are not intended to mark key or important features of the embodiments of the present disclosure or limit the scope of the present disclosure. Other features of the present disclosure will be easily understood through the following specification.

BRIEF DESCRIPTION OF THE DRAWINGS

The accompanying drawings illustrate embodiments and construct a part of the specification, and they serve to explain example implementations of the embodiments together with textual description in the specification. The shown embodiments are only for the purpose of illustration, instead of limiting the scope of the claims. In all the accompanying drawings, the same numerals indicate similar, but not necessarily same elements.

DETAILED DESCRIPTION OF THE EMBODIMENTS

Figure 1:
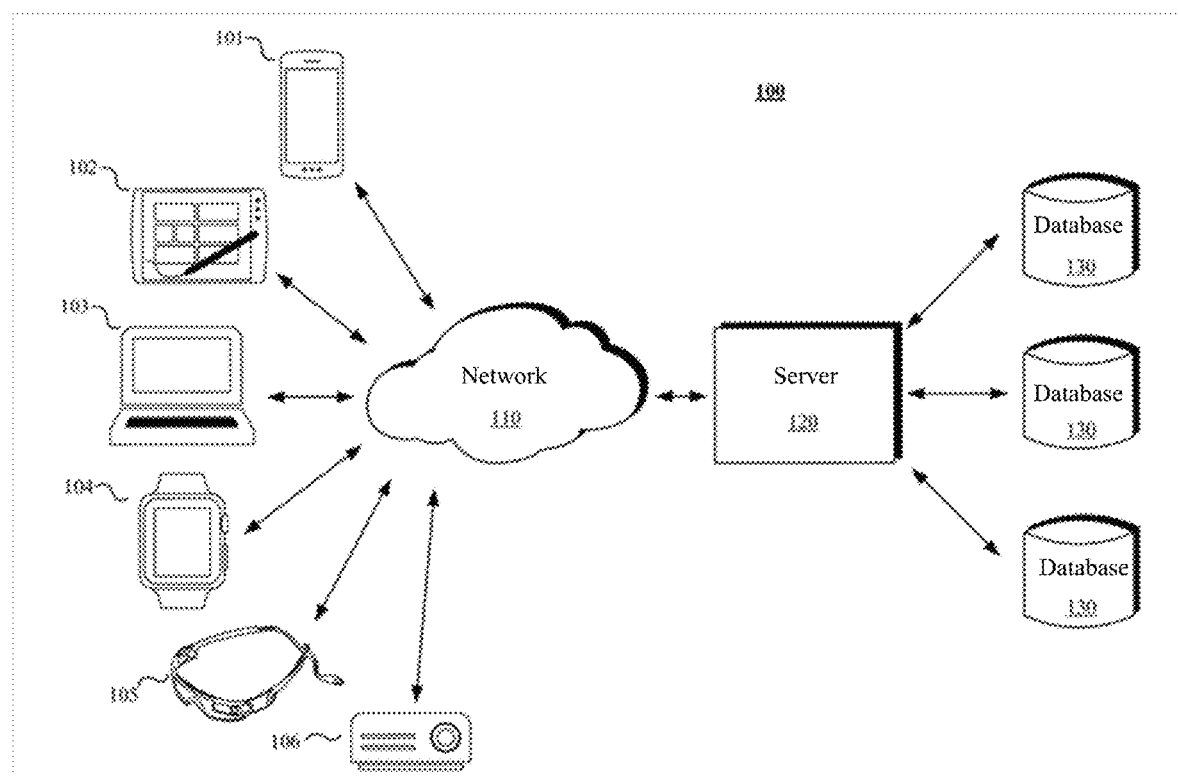
FIG. 1 shows a schematic diagram of an example system in which various methods described herein may be implemented according to an embodiment of the present disclosure.

Example embodiments of the present disclosure will be described below in conjunction with the accompanying drawings, wherein various details of the embodiments of the present disclosure are included for helping understanding, and they are only regarded as examples. Therefore, it should be recognized by the ordinary skill in the art that various changes and modification on the embodiments described herein may be made without departing from the scope of the present disclosure. Likewise, in order to realize clearness and conciseness, description for known functions and structures are omitted in the following description.

In the present disclosure, unless otherwise specified, terms such as "first" and "second" used for describing various elements is not intended to limit a positional, sequential or importance relationship among these elements, and such terms are only used to one of the elements from another element. In some examples, a first element and a second element can refer to the same example of the elements. However, in some cases, they can also refer to different examples based on contextual description.

Terms used in the description of various examples in the present disclosure are only for the purpose of describing, rather than limiting, specific examples. Unless otherwise indicated clearly in the context, if the number of the elements is not purposely limited, there can be one or more elements. In addition, the term "and/or" used in the present disclosure covers any one or all of possible combination manners in listed items.

In a V2X (Vehicle to Everything) technology, a new development direction of an automobile technology is established by integrating a global positioning system (GPS) navigation technology, a vehicle-to-vehicle communication technology and a wireless communication and remote induction technology. In the V2X technology, road information can be acquired by using a roadside sensing technology, thereby providing necessary information for solutions such as intelligent traffic and automatic drive. In some applications, the required road information can be acquired by a roadside sensing device disposed near a road. For example, road information can be acquired by roadside sensing devices disposed at two sides of a straight road or intersections.

In a system architecture for vehicle and road cooperation of intelligent traffic, a roadside device may include a roadside sensing device and a roadside computing device. The roadside sensing device (such as a roadside camera) is connected to the roadside computing device (such as a roadside computing unit RSCU), and the roadside computing device is connected to a cloud control platform. In another system architecture, the roadside sensing device itself has a computing function That is, the roadside device may be a roadside sensing device with a computing function, and the roadside sensing device may be directly connected to the cloud control platform. The above-mentioned connections may be wired or wireless. The cloud control platform may also be referred to as a vehicle and road cooperative management platform, a central system, an edge computing platform, a cloud computing platform, a cloud server and the like. The cloud control platform performs processing at a cloud, and an electronic device included by the cloud control platform is capable of acquiring data, such as pictures and videos, of the sensing device (such as the roadside camera), thereby performing image video processing and data computation.

The roadside sensing technology is a technology for transmitting a sensed obstacle to a vehicle by a roadside sensor and a sensing algorithm, thereby helping the vehicle achieve an automatic drive function. The current roadside sensing sensor includes a webcam, a lidar and the like. In a V2X roadside sensing scenario, in order to acquire road traffic information beyond a visual range by utilizing the camera, the camera is generally mounted on a street lamp pole or a traffic light pole. The higher the camera is, the larger an acquired image is in field of view and more information content is included, and the stronger the roadside sensing capacity. However, when being mounted on a relatively high pole, the camera may shake under the blow of wind or when a heavy truck passes. When the position of the camera changes, errors caused by shake may be introduced when projecting the obstacle back to 3D by utilizing offline calibrated external parameters of the camera. When excessive shake happens, the offline external parameters will be invalid, and thus, the position of the obstacle will be seriously inaccurate. Therefore, an algorithm is needed to optimize the detection for a 3D position in the case of camera shake. The external parameters of the camera may include a rotation matrix and a translation matrix. The rotation matrix and the translation matrix which are used as the external parameters of the camera collectively describe how to transform a point from a world coordinate system to a camera coordinate system.

General methods for solving camera shake include an optical anti-shake method, a mechanical anti-shake method and an electronic anti-shake method. Due to the limitation of roadside sensing cost, the optical anti-shake method and the mechanical anti-shake method which require additional cost cannot be used on a larger scale, and the ordinary electronic anti-shake method can generate great errors as well when facing the roadside camera.

A relatively popular method is to calibrate the external parameters on line and update the offline external parameters by computing the external parameters of the camera in real time, thereby solving the problem that the offline external parameters in a roadside sensing system are invalid. Such a method can meet demands of precision and real-time property on better hardware, but consume computing ability so as to be relatively high in cost.

In order to solve the above-mentioned problems, the present disclosure provides a novel method for detecting an obstacle, by which correction of errors caused by the change of external parameters due to camera shake can be conveniently realized.

The embodiments of the present disclosure will be described in detail below in conjunction with the accompanying drawings.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120 and one or more communication networks 110 for coupling the one or more client devices to the server 120. The client devices 101, 102, 103, 104, 105 and 106 may be configured to execute one or more applications.

In the embodiments of the present disclosure, the server 120 is capable of running, so that one or more services or software applications of the method for detecting the obstacle according to the present disclosure may be executed. In some embodiments, it is also possible that the one or more services or software applications in the method for detecting the obstacle according to the present disclosure are capable of running by utilizing the client devices 101, 102, 103, 104, 105 and 106. In some implementations, the client devices 101, 102, 103, 104, 105 and 106 may be used for achieving a roadside device in a V2X system.

In some embodiments, the server 120 may further provide other services or software applications including a non-virtual environment and a virtual environment. In some embodiments, these services may be provided as web-based services or cloud services, for example, they are provided to users of the client devices 101, 102, 103, 104, 105 and/or 106 under a model of software as a service (SaaS).

In the configuration as shown in FIG. 1, the server 120 may include one or more components achieving functions executed by the server 120. These components may include a software component, a hardware component or a combination thereof executed by one or more processors. The users of the client devices 101, 102, 103, 104, 105 and/or 106 may interact with the server 120 by sequentially utilizing one or more client applications to utilize services provided by these components. It should be understood that various different system configurations are possible and may be different from the configuration of the system 100. Therefore, FIG. 1 is an example of a system for executing various methods described herein and is not intended to be limiting.

The client device may be provided with an interface for an interaction between a user of the client device and the client device. The client device is also capable of outputting information to the user through the interface. Although FIG. 1 only shows six client devices, it should be understood by the skilled in the art that the present disclosure can support any number of client devices.

The client devices 101, 102, 103, 104, 105 and/or 106 may include various types of computer devices, such as a portable handheld device, a general-purpose computer (such as a personal computer and a laptop computer), a workstation computer, a wearable device, a game system, a thin client, various message transceiving devices, a sensor or other sensing devices. By using these computer devices, various types and editions of software applications and operating systems such as Microsoft Windows, Apple iOS, a UNIX-like operating system, an Linux or Linux-like operating system (such as Google Chrome OS), or various mobile operating systems such as Microsoft Windows Mobile OS, iOS, Windows Phone and Android are capable of running. The portable handheld device may include a cell phone, a smart phone, a tablet computer, a personal digital assistant (PDA) and the like. The wearable device may include a heat-mounted display and other devices. The game system may include various handheld game devices, game devices supporting the Internet, and the like. The client devices are capable of executing various different applications such as various Internet-relevant applications, a communication application (such as an E-mail application) and a short message service (SMS) application and are capable of using various communication protocols.

The networks 110 may be any types of networks familiar to the skilled in the art and may support data communication by any one of various available protocols (including, but not limited to TCP/IP, SNA and IPX). Only as an example, one or more networks 110 may be a local area network (LAN), an Ethernet-based network, a token ring, a wide area network (WAN), an Internet, a virtual network, a virtual private network (VPN), an intranet, an extranet, a public switched telephone network (PSTN), an infrared network, a wireless network (such as a Bluetooth and a WIFI) and/or any combinations of these and/or other networks.

The server 120 may include one or more general-purpose computers, a specialized server computer (such as a PC (Personal Computer) server, a UNIX server and a mid-end server), a blade server, a large-scale computer, a server cluster or any other appropriate layouts and/or combinations. The server 120 may include one or more virtual machines allowing a virtual operating system to run, or relate to other virtualized computing architectures (such as one or more flexible pools which may be virtualized to maintain a logic storage device of a virtual storage device of a server). In various embodiments, by using the server 120, one or more services or software applications providing functions described below are capable of running.

By using a computing unit in the server 120, one or more operating systems including any of the above-mentioned operating systems and any commercially-available server operating systems are capable of running. The server 120 may also run any one of various additional server applications and/or applications in a middle tier, including an HTTP server, an FTP server, a CGI server, a JAVA server, a database server and the like.

In some implementations, the server 120 may include one or more applications so as to analyze and incorporate data feed and/or event update received from the users of the client devices 101, 102, 103, 104, 105 and/or 106. The server 120 may further include one or more applications so as to display the data feed and/or a real-time event through one or more display devices of the client devices 101, 102, 103, 104, 105 and/or 106.

In some implementations, the server 120 may be a server of a distributed system, or a server combined with a block chain. The server 120 may also be a cloud server, or an intelligent cloud computing server or an intelligent cloud host with an artificial intelligence technology. The cloud server is a host product in a cloud computing service system and is used for overcoming the defects of high management difficulty and weak service extensibility existing in services of a traditional physical host and a VPS (Virtual Private Server).

The system 100 may further include one or more databases 130. In some embodiments, these databases may be used for storing data and other information. For example, one or more of the databases 130 may be used for storing information such as an audio file and a video file. The databases 130 may stay on various positions. For example, databases used by the server 120 may stay on a local position of the server 120, or may be away from the server 120 and may perform communication with the server 120 based on network or specified connection. The databases 130 may be of different types. In some embodiments, the databases used by the server 120 may be databases such as relational databases. One or more of these databases are capable of storing, updating and retrieving databases and data from the databases in response to a command.

In some embodiments, one or more of the databases 130 may also be used by applications to store application data. The databases used by the applications may be different types of databases, such as key-value stores, object stores or conventional stores supported by a file system.

The system 100 shown in FIG. 1 may be configured and operated in various manners, so that various methods and apparatuses described according to the present disclosure may be applied.

Figure 2:
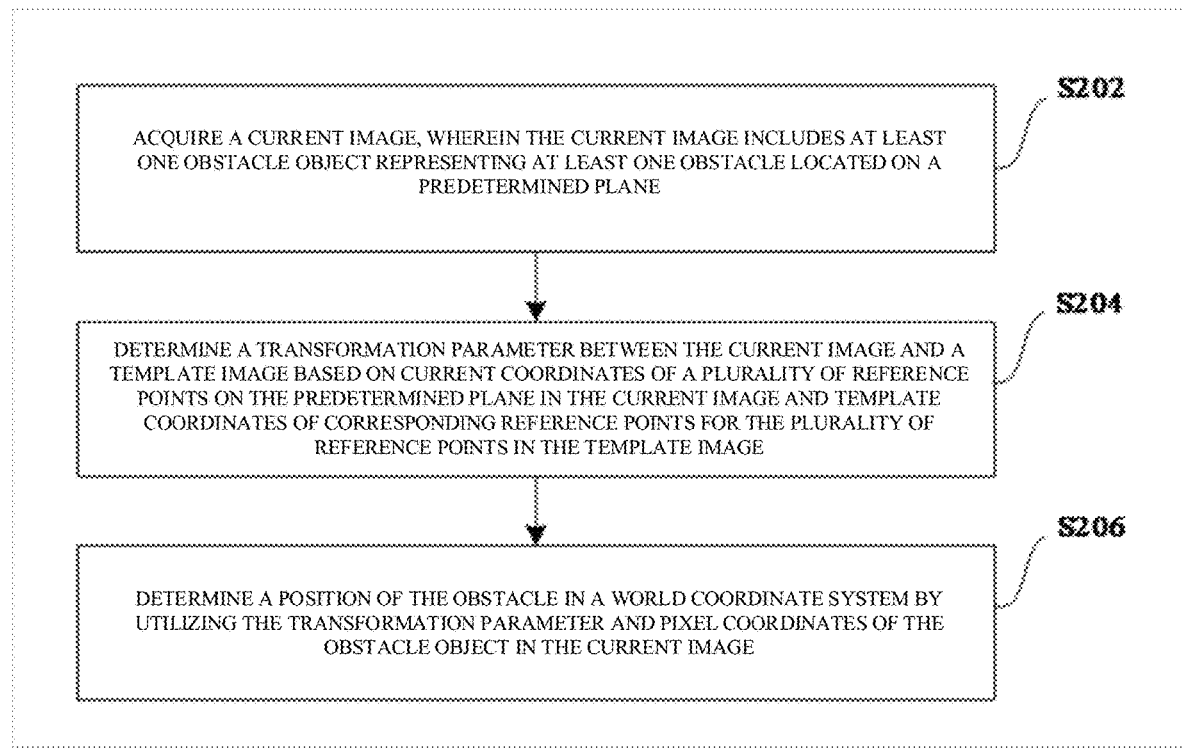
FIG. 2 shows a schematic flowchart of a method for detecting an obstacle according to an embodiment of the present disclosure.

FIG. 2 shows a schematic flowchart of a method for detecting an obstacle according to an embodiment of the present disclosure.

As shown in FIG. 2, in step S202, a current image may be acquired, wherein the current image may include at least one obstacle object of at least one obstacle located on a predetermined plane.

In some embodiments, the current image may be a road monitoring image acquired by a roadside device. In some implementations, the current image may be a photo acquired by a roadside device. In some other implementations, the current image may also be a video frame in a video acquired by a roadside device.

A position of an obstacle on a road may be monitored by utilizing the monitoring image acquired by the roadside device. In some embodiments, the predetermined plane may be the ground plane. That is, the obstacle in the current image is located on the ground plane.

In some embodiments, the current image may be acquired using a monocular camera.

Generally, determining a position of an object in an image in a three-dimensional world coordinate system by utilizing the image acquired using the monocular camera is under constraint. In the case that there are no other constraints, a pixel coordinate of the object in the image corresponds to a ray in the world coordinate system. That is, pixel coordinates of all points, located on the ray in the three-dimensional world coordinate system, in the image acquired by the camera are the same. However, if an equation for expressing a specific plane may be pre-calibrated in the image, the position of the object located on the specific plane in the image in the world coordinate system may be determined using the monocular camera.

In an application scenario of V2X, shot images are generally road images, and therefore, ground planes in the images are calibrated to obtain a ground plane equation in a camera coordinate system, that is, $Ax+By+Cz+D=0$, wherein A, B, C and D are pre-calibrated coefficients, and x, y and z are independent variables in three dimensions in the camera coordinate system.

In the case of the ground plane equation in the known camera coordinate system, a position of a pixel point on the ground plane may be obtained by computing an intersection point of a ray corresponding to pixel coordinates of the pixel point and the ground plane.

In step S204, a transformation parameter between the current image and a template image may be determined based on current coordinates of a plurality of reference points on the predetermined plane in the current image and template coordinates of corresponding reference points for the plurality of reference points in the template image. A plane where the plurality of reference points are located and the predetermined plane where the obstacle is located correspond to the same plane.

In some embodiments, an image shot by the roadside device in an original external parameter state may be acquired as the template image before the roadside device is put into use. Original external parameters (that is, offline external parameters) of the roadside device when the template image is shot may be determined. After the roadside device is put into use, the image shot by the roadside device may be processed based on the offline external parameters so as to determine a three-dimensional position of the obstacle in the image.

Due to influences from external environments, the roadside device for acquiring images may shake or permanently move. For example, when strong wind blows or a heavy vehicle passes, the external parameters of the camera of the roadside device may change, but the ground plane equation is still calibrated based on the original external parameters of the camera which are determined offline. In this case, the precision of the position of the obstacle object, in the image determined by the ground plane equation calibrated based on the original external parameters of the camera, in the world coordinate system may be reduced.

In order to correct influences of the shake or motion of the roadside device to position detection of the obstacle, the transformation parameter between the current image and the template image may be determined based on image change between the template image and the current image. The transformation parameter between the current image and the template image is capable of reflecting changes of the current external parameters of the camera acquiring the current image relative to the original external parameters of the camera acquiring the template image. By using such a transformation parameter, the pixel coordinates in the current image acquired by the roadside device by utilizing the current external parameters may be transformed into corresponding coordinates of respective pixel points in the image acquired by utilizing the offline external parameters, without specially determining specific change values of the external parameters.

In step S206, the position of the obstacle in the world coordinate system may be determined by utilizing the transformation parameter determined in step S204 and the pixel coordinates of the obstacle in the current image.

Coordinate transformation may be performed on the pixel coordinates of the obstacle in the current image by utilizing the transformation parameter determined in step S204 to obtain corresponding pixel coordinates of the obstacle in the template image acquired by utilizing the offline external parameters.

By using the method provided by the present disclosure, the transformation between the current image acquired by the roadside device and the template image acquired by the roadside device by utilizing the offline external parameters may be determined by utilizing the plurality of reference points in the images, thereby conveniently correcting errors caused by change of the external parameters of the roadside device due to external environments, and then, eliminating adverse effects brought for the position detection of the obstacle in the acquired images due to the fact that the external parameters actually change, but are not re-calibrated in the camera.

Figure 3:
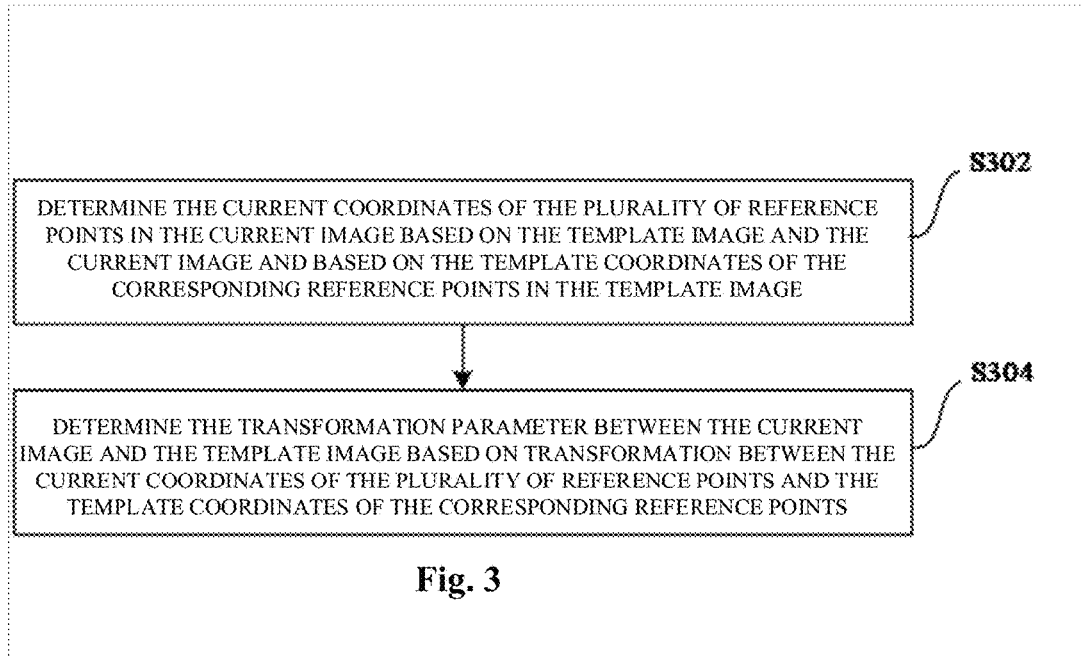
FIG. 3 shows a schematic flowchart for determining a transformation parameter between a current image and a template image according to an embodiment of the present disclosure.

FIG. 3 shows a schematic flowchart for determining a transformation parameter between a current image and a template image (such as above-mentioned step S204) according to an embodiment of the present disclosure. By using the method as shown in FIG. 3, the current coordinates of the reference points may be obtained based on the template coordinates without knowing the change of the external parameters of the camera, thereby correcting the errors, caused by the change of the external parameters of the camera, in an image processing manner.

In step S302, the current coordinates of the plurality of reference points in the current image may be determined based on the template image and the current image and based on the template coordinates of the corresponding reference points in the template image.

In a V2X system, the plurality of reference points in the template image acquired by the roadside device may be points on a marker line (such as a lane line, a stop line or a turning marker line) on a road surface. For example, the reference points may be angular points of the lane line, the stop line or the turning marker line. The angular points described herein may refer to intersection points of line segments included in graphs for representing the lane line, the stop line or the turning marker line on a road.

It can be understood that there are the graphs of the lane line, the stop line or the turning marker line for indicating a lane or a driving rule on the road. Such marker line is generally fixed in an actual application scenario. Therefore, the reference points may be determined by utilizing the graph of the marker line on the ground.

It can be understood by the skilled in the art that points on other fixed patterns in the template image may also be used as the reference points according to an actual condition when the method provided by the present disclosure is applied to other scenarios.

The transformation parameter between the current image and the template image may be determined by utilizing change of the reference points in the current image relative to the corresponding reference points in the template image. In some embodiments, a first offset of each reference point in the current image relative to the corresponding reference point in the template image may be determined by utilizing an optical flow tracking method. The current coordinates of the reference points may be determined based on the template coordinates of the reference points in the template image and the first offset. By using the optical flow tracking method, positions of the reference points in the current image may be conveniently determined.

The optical flow tracking method may be used for tracking the motion of points in an image. An optical flow may be motion of a target caused when the target, scenario or camera moves between two frame images. The optical flow is capable of reflecting image change formed by motion within a certain time interval, thereby determining motion directions and rates of the points in the image.

By using the optical flow tracking method, the motion of the plurality of reference points in the current image relative to the corresponding reference points in the template image may be determined, and the first offset generated when the plurality of reference points move from corresponding positions in the template image to positions in the current image may be determined. In the case that the template coordinates of the corresponding reference points in the template image are known, the current coordinates of the reference points in the current image may be obtained by utilizing the template coordinates of the corresponding reference points and a motion vector determined by utilizing the first offset.

In step S304, the transformation parameter between the current image and the template image may be determined based on transformation between the current coordinates of the plurality of reference points and the template coordinates of the corresponding reference points. The transformation parameter may be used for transforming a plane where the plurality of reference points in the current image are located into a plane where the corresponding reference points in the template image are located.

Positional differences of the reference points between the current image and the template image are generated by the change of the external parameters of the camera due to influences from the external environments. In other words, the rotation and/or translation of the camera in the world coordinate system occurs to result in the change of positions of the reference points in the image. Therefore, a transformation parameter of the plane where the reference points are located may be computed as the transformation parameter between the current image and the template image based on a manner of coordinate transformation.

In some embodiments, the transformation parameter may be a homographic matrix. The homographic matrix may be used for describing rotation of an image acquiring device or a transformation relationship between planes. In the embodiment of the present disclosure, the reference points are located on the ground. Therefore, a transformation relationship between a ground plane in the current image and a ground plane in the template image may be computed by utilizing the template coordinates and ground coordinates of the reference points. In some implementations, a homographic transformation parameter may be a homographic matrix with 8 degrees of freedom and 3*3 dimensions. Due to the consideration that the coordinates of the reference points may be indicated as two-dimensional pixel coordinates including two independent variables, the homographic matrix may be computed by utilizing at least four matching point pairs in the case that the reference points in the template image and the corresponding reference points in the current image are regarded as a pair of matching points. In this case, a process of computing a coefficient of the homographic matrix is converted into a process of solving an over-determined equation set, the coefficient of the homographic matrix may be determined by utilizing the least square solution of the over-determined equation set. The larger the number of the matching points used in the computing process is, the higher the accuracy of the homographic matrix obtained by computation is.

Figure 4:
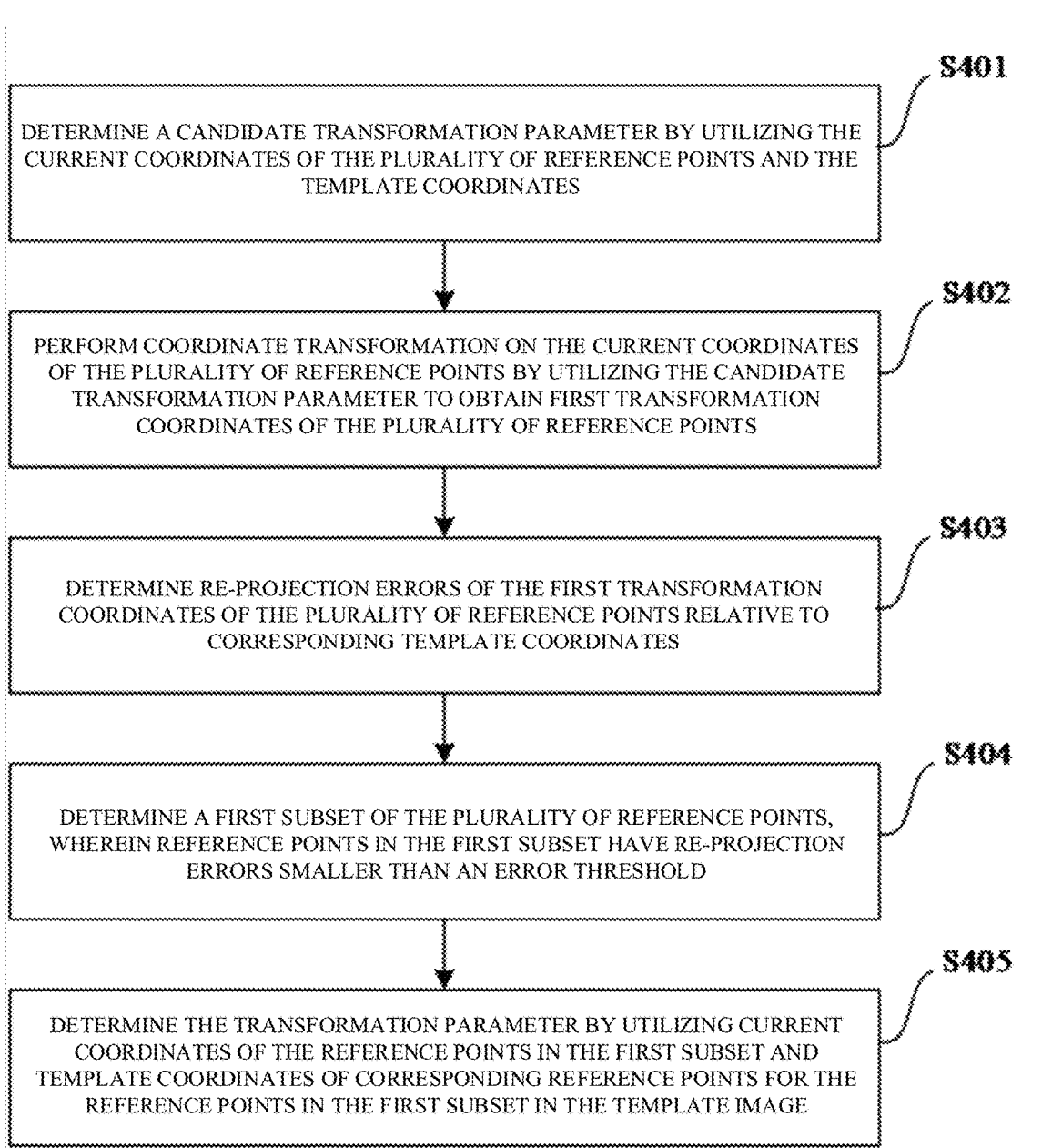
FIG. 4 shows a schematic flowchart for determining a transformation parameter between a current image and a template image based on current coordinates of a plurality of reference points and template coordinates of corresponding reference points according to an embodiment of the present disclosure.

FIG. 4 shows a schematic flowchart for determining a transformation parameter between a current image and a template image based on current coordinates of a plurality of reference points and template coordinates of corresponding reference points (such as above-mentioned step S304) according to an embodiment of the present disclosure. By using the method as shown in FIG. 4, the reference points with greater errors may be removed, so that the accuracy of the transformation parameter is improved.

In some cases, there are moving pedestrians and vehicles in a shot road image, and therefore, a part of reference points determined in the template image may be shielded. In this case, the coordinates, determined using the optical flow tracking method, of the reference points in the current image may be not accurate enough. Therefore, in some embodiments, the coefficient of the computed homographic matrix is not directly determined as the transformation parameter between the current image and the template image by utilizing the matching points formed by the current coordinates of the plurality of reference points and the template coordinates of the corresponding reference points. The plurality of reference points may be screened using the method as shown in FIG. 4 to obtain a subset of the plurality of reference points suitable for determining the above-mentioned transformation parameter.

As shown in FIG. 4, in step S401, a candidate transformation parameter may be determined by utilizing the current coordinates of the plurality of reference points and the template coordinates.

In some embodiments, taking the transformation parameter being the homographic matrix as an example, the coefficient in the homographic matrix may be computed as the candidate transformation parameter by utilizing the matching point pairs formed by the current coordinates of the plurality of reference points and the template coordinates of the corresponding reference points.

In step S402, coordinate transformation may be performed on the current coordinates of the plurality of reference points by utilizing the candidate transformation parameter to obtain first transformation coordinates of the plurality of reference points.

In an ideal case, if coordinates of the matching point pairs for computing the candidate transformation parameter are accurate, the first transformation coordinates obtained by performing coordinate transformation on the current coordinates of the plurality of reference points by utilizing the candidate transformation parameter should be the same as the template coordinates of the corresponding reference points in the template image. However, if there are greater errors in the current coordinates, determined using the optical flow tracking method, of the reference points in the current image, there are also greater errors between the first transformation coordinates of the reference points obtained in step S402 and the template coordinates.

In step S403, re-projection errors of the first transformation coordinates of the plurality of reference points relative to corresponding template coordinates may be determined.

In step S404, a first subset of the plurality of reference points may be determined by utilizing the re-projection errors determined in step S403, wherein reference points in the first subset have re-projection errors smaller than an error threshold.

In step S405, the transformation parameter may be determined by utilizing current coordinates of the reference points in the first subset and template coordinates of corresponding reference points for the reference points in the first subset, in the template image.

By using the process described in combination with FIG. 4, the current coordinates of the reference points may be transformed by utilizing the candidate transformation parameter, so that differences of the coordinates, obtained by utilizing the candidate transformation parameter, of the reference points in the template image and the pre-calibrated template coordinates are compared, and reference points with greater differences are removed. The transformation parameter between the current image and the template image may be recomputed by utilizing reference points with few differences.

Figure 5:
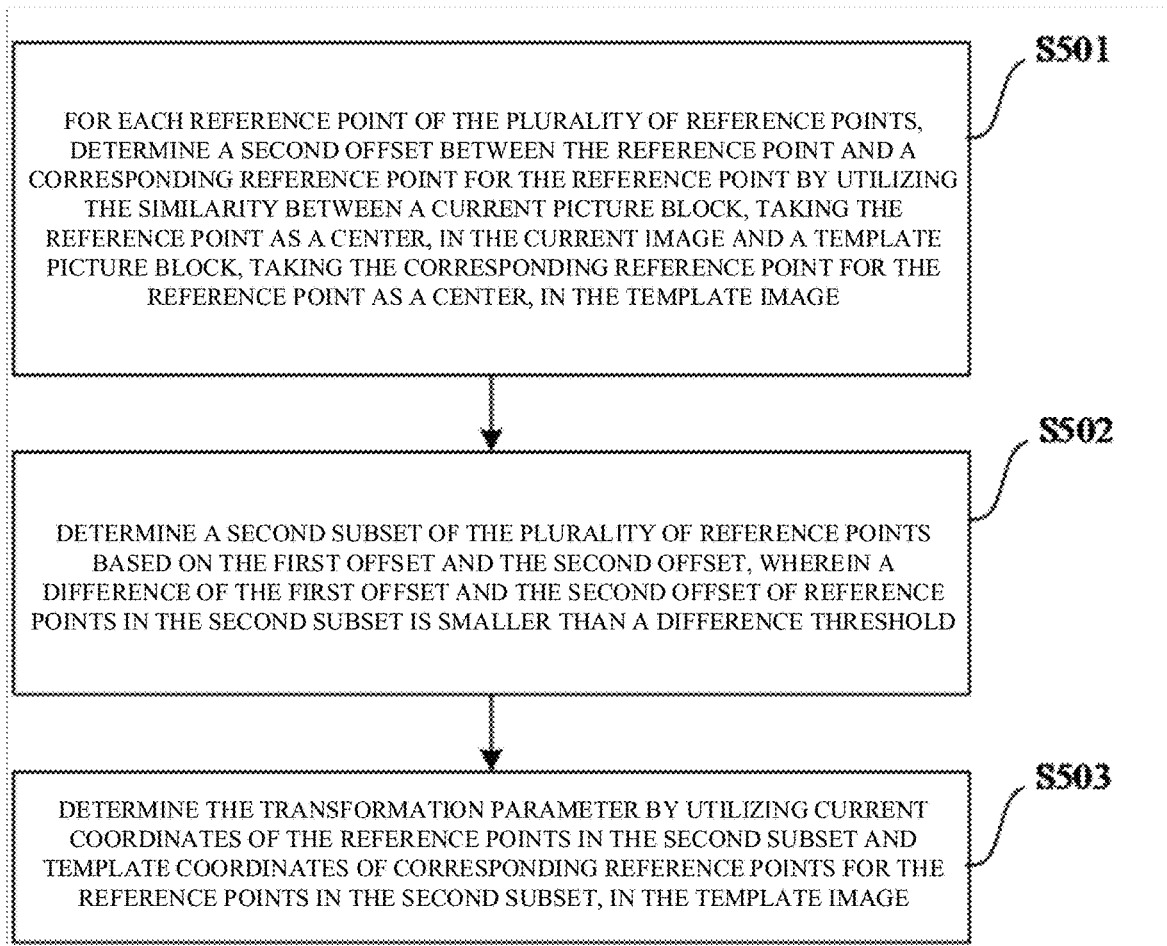
FIG. 5 shows another schematic flowchart for determining a transformation parameter between a current image and a template image based on current coordinates of a plurality of reference points and template coordinates of corresponding reference points according to an embodiment of the present disclosure.

FIG. 5 shows another schematic flowchart for determining a transformation parameter between a current image and a template image based on current coordinates of a plurality of reference points and template coordinates of corresponding reference points (such as above-mentioned steps S304) according to an embodiment of the present disclosure. By using the method as shown in FIG. 5, the reference points with greater errors may be removed, so that the accuracy of the transformation parameter may be improved.

In step S501, for each reference point of the plurality of reference points, a second offset between the reference point and a reference point corresponding to the reference point may be determined by utilizing the similarity between a current picture block, centered at the reference point, in the current image and a template picture block, centered at the corresponding reference point, in the template image.

In some embodiments, the current picture block and the template picture block may be picture blocks with pixels of which lengths and widths are respectively 101. The second offset of the reference point may be determined by computing the similarity between the current picture block and the template picture block. In some implementations, the second offset may be determined by computing the phase-based similarity between the current picture block and the template picture block. It can be understood by the skilled in the art that the similarity between the current picture block and the template picture block may also be determined using any other image processing methods if only such similarity may indicate the offset of the reference point.

In step S502, a second subset of the plurality of reference points may be determined based on the first offset and the second offset, wherein a difference of the first offset and the second offset of reference points in the second subset is smaller than a difference threshold.

The reference points in the first subset may be further screened by utilizing the second offset determined in step S501. If the difference of the first offset and the second offset is greater than the difference threshold, the position of the reference point may be regarded as being unbelievable. Therefore, such reference point may be removed when the transformation parameter is computed.

In step S503, the transformation parameter may be determined by utilizing current coordinates of the reference points in the second subset and template coordinates of corresponding reference points for the reference points in the second subset, in the template image.

In some embodiments, after the reference points in the first subset are obtained using the method as shown in FIG. 4, the steps described in FIG. 5 may be performed on the reference points in the first subset to obtain the second subset. In this case, the second subset may be a subset of the first subset.

Figure 6:
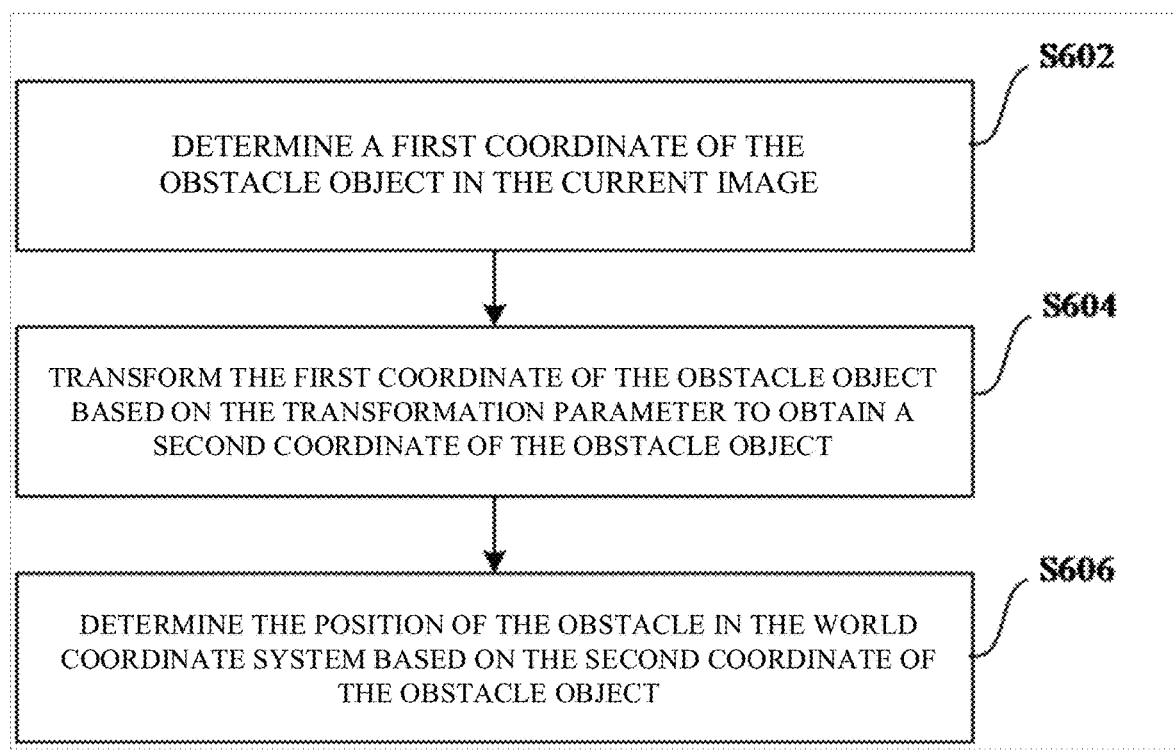
FIG. 6 shows a schematic flowchart of a process for determining a position of an obstacle in a world coordinate system by utilizing a transformation parameter and pixel coordinates of the obstacle in a current image according to an embodiment of the present disclosure.

FIG. 6 shows a schematic flowchart of a process for determining a position of an obstacle in a world coordinate system by utilizing the transformation parameter and pixel coordinates of an obstacle object in the current image (such as above-mentioned step S206) according to an embodiment of the present disclosure. Due to the fact that the obstacle and reference points are located on the same plane, coordinates of the obstacle object in the current image may be transformed on a template image conveniently by utilizing the transformation parameter computed using the reference points, and therefore, three-dimensional coordinates of the obstacle in the world coordinate system may be determined.

In step S602, a first coordinate of the obstacle object in the current image may be determined.

In some embodiments, the current image may be processed using a target detection algorithm, so that the obstacle object representing the obstacle in the current image is recognized. In an application scenario of V2X, the obstacle may be a pedestrian or vehicle. In some implementations, a target box of the obstacle object existing in the current image may be recognized using the target detection algorithm, bottom central point coordinates for indicating the obstacle object may be determined as the first coordinates on the target box. For example, the bottom central point coordinates for indicating the obstacle object may be determined on the target box based on the type of the obstacle. In some other implementations, a model for realizing the target detection algorithm may be trained, so that the model may learn a position of a bottom central point of the obstacle object, and the position of the bottom central point of the obstacle object may be directly determined by utilizing a result output by the model.

In step S604, the first coordinate of the obstacle may be transformed based on the transformation parameter to obtain a second coordinate of the obstacle.

The second coordinate of the obstacle object in the template image may be determined based on the first coordinates of the obstacle object in the current image by utilizing the transformation parameter determined using the method described by at least one accompanying drawing in FIG. 1 to FIG. 5. By using the method, the problem that the position of the obstacle object in the image is inaccurate due to the change of the external parameter of the camera may be eliminated.

In step S606, the position of the obstacle in the world coordinate system may be determined based on the second coordinate of the obstacle object.

As mentioned previously, before the roadside device is put into use, the ground plane in the template image has been calibrated. Therefore, a position of an obstacle in a camera coordinate system may be determined based on the second coordinates of the obstacle object by utilizing an equation for indicating the predetermined plane in the camera coordinate system. Based on a geometric transformation relationship between the camera coordinate system and the world coordinate system, the position of the obstacle in the world coordinate system may be determined based on the position of the obstacle in the camera coordinate system. Depth information of the obstacle on the predetermined plane may be provided by utilizing an equation of the known predetermined plane.

Figure 7:
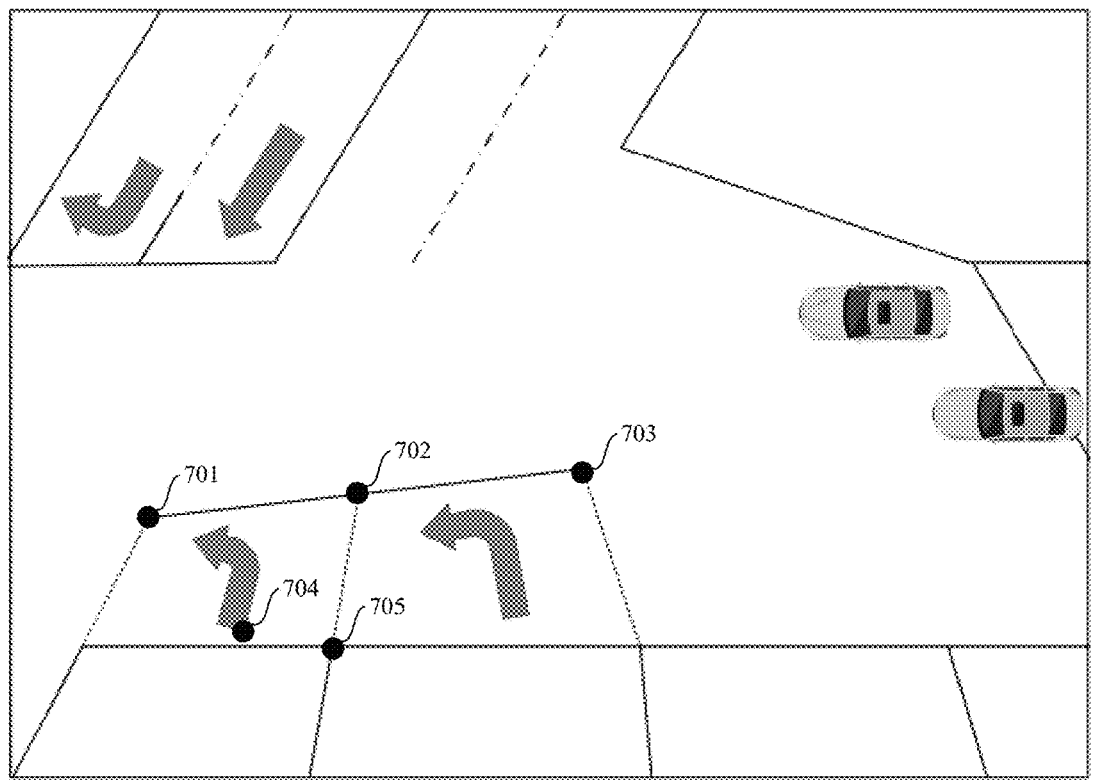
FIG. 7 shows a schematic diagram of reference points in an image according to an embodiment of the present disclosure.

FIG. 7 shows a schematic diagram of reference points in an image according to an embodiment of the present disclosure. As shown in FIG. 7, points on a marker line on a road may be determined as the reference points. For example, points 701, 702, 703 and 705 are angular points of a lane line, and point 704 is an angular point of a turning marker line.

FIG. 7 only shows the reference points 701 to 705, however, it can be understood that the skilled in the art may more points on the marker line shown in FIG. 7 may be determined as the reference points.

Figure 8A:
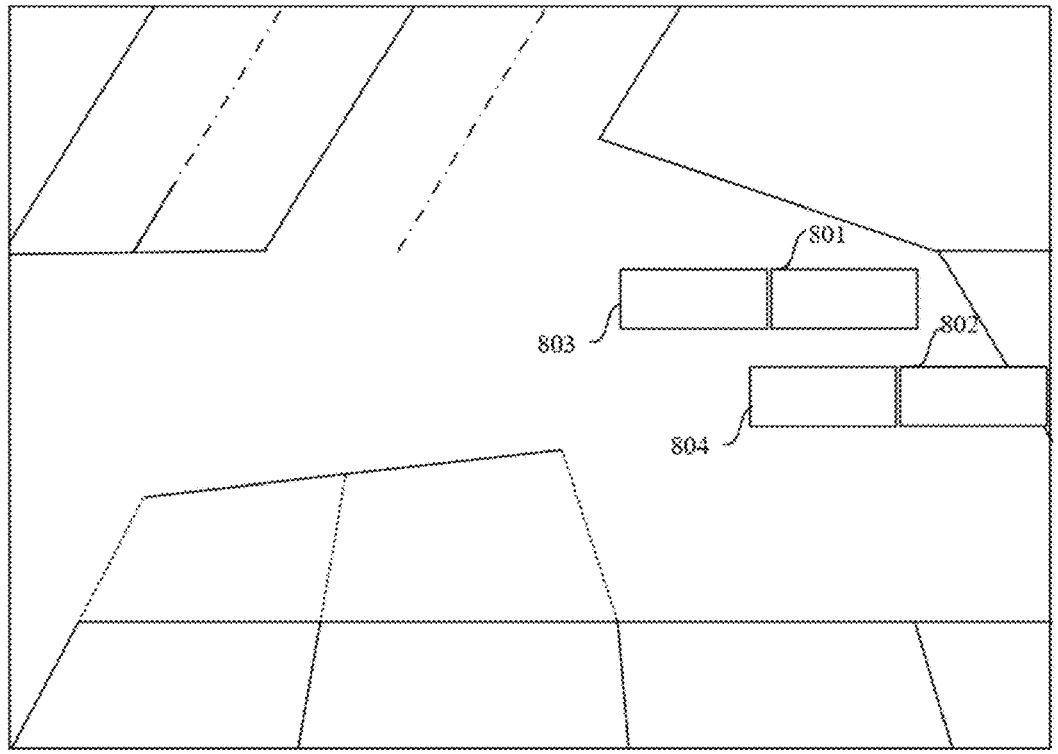
FIG. 8A and FIG. 8B show schematic diagrams of a detection result of an obstacle.
Figure 8B:
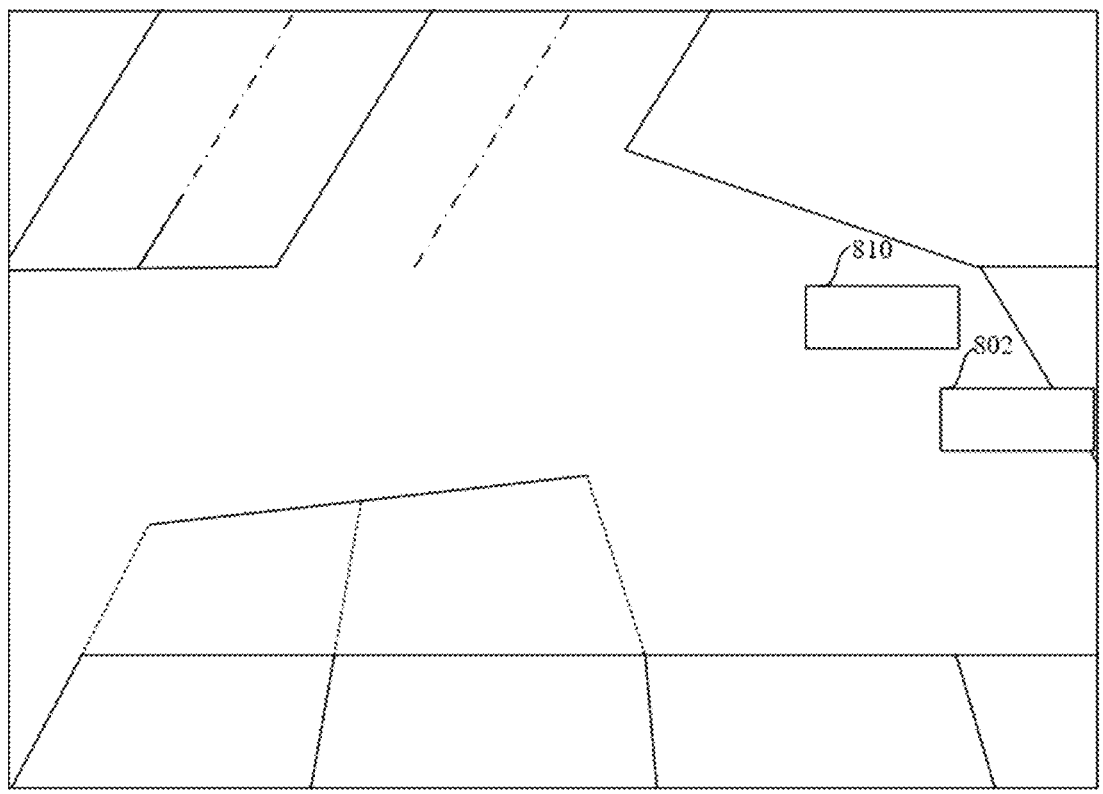

FIG. 8A and FIG. 8B show schematic diagrams of a detection result of an obstacle.

FIG. 8A shows obstacles, which are respectively recognized under the condition that cameras of two roadside devices shake, on a road in the case that correction is not performed. Boxes 801 and 803 correspond to detection positions, respectively detected by the two roadside devices, of the same vehicle on an actual road, and boxes 802 and 804 correspond to detection positions, respectively detected by the two roadside devices, of the other same vehicle on the actual road. Since the shake of the cameras is not corrected, positions of the obstacles (the vehicles) detected in images acquired by the two roadside devices are different. In this case, it may be considered in combination with the images acquired by the two roadside devices that there are four vehicles on an intersection, which is different from actual conditions.

FIG. 8B shows obstacles, recognized under the condition that cameras of two roadside devices shake, on a road in the case that correction is performed. Since the shake of the cameras of the roadside devices has been corrected, the two roadside devices are capable of detecting the vehicles 801 and 802 on the same position at different shooting angles. Therefore, detection errors caused by camera shake are avoided.

Figure 9:
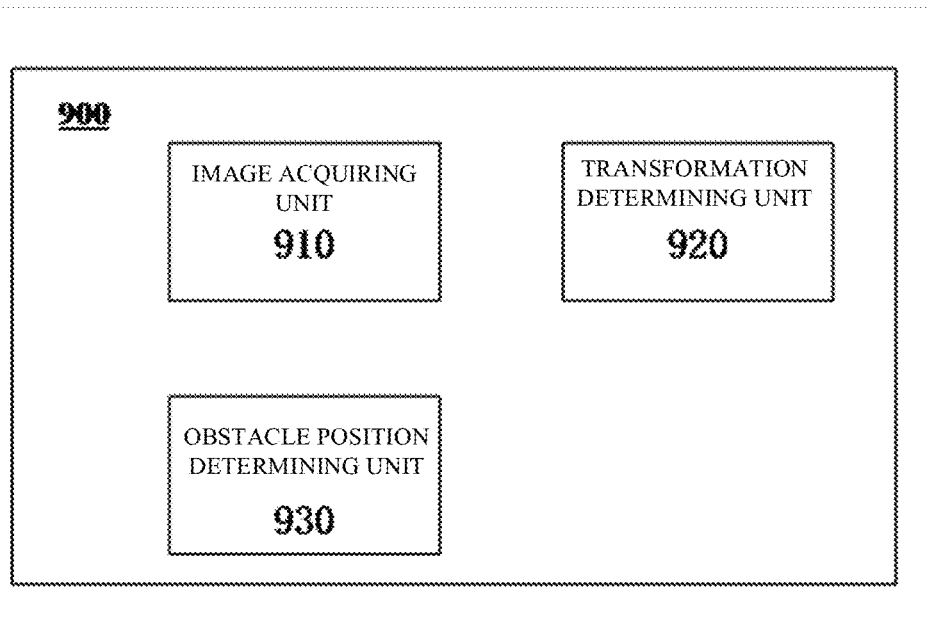
FIG. 9 shows a schematic block diagram of an apparatus for detecting an obstacle according to an embodiment of the present disclosure.

FIG. 9 shows a schematic block diagram of an apparatus for detecting an obstacle according to an embodiment of the present disclosure. As shown in FIG. 9, the apparatus 900 for detecting the obstacle may include an image acquiring unit 910, a transformation determining unit 920 and an obstacle position determining unit 930.

The image acquiring unit 910 may be configured to acquire a current image, wherein the current image includes at least one obstacle located on a predetermined plane. The transformation determining unit 920 may be configured to determine a transformation parameter between the current image and a template image based on current coordinates of a plurality of reference points on the predetermined plane in the current image and template coordinates of corresponding reference points for the plurality of reference points, in the template image. The obstacle position determining unit 930 may be configured to determine a position of the obstacle in a world coordinate system by utilizing the transformation parameter and pixel coordinates of the obstacle object in the current image.

Operations of all the above-mentioned units 910 to 930 of the apparatus 900 described herein for detecting the obstacle are respectively similar to the operations of the steps S202-S206 described previously so as not to be repeated herein.

According to some embodiments, the transformation determining unit may include: a coordinate determining subunit, configured to determine the current coordinates of the plurality of reference points in the current image based on the template image and the current image and based on the template coordinates of the corresponding reference points in the template image; and a parameter determining unit, configured to determine the transformation parameter between the current image and the template image based on transformation between the current coordinates of the plurality of reference points and the template coordinates of the corresponding reference points.

According to some embodiments, the coordinate determining subunit may include: a tracking subunit, configured to determine a first offset of the reference points in the current image relative to the corresponding reference points in the template image using an optical flow tracking method; and an offset subunit, configured to determine the current coordinates of the reference points based on the first offset of the reference points and the template coordinates.

According to some embodiments, the parameter determining unit may include: a candidate transformation determining subunit, configured to determine a candidate transformation parameter by utilizing the current coordinates of the plurality of reference points and the template coordinates; a transformation subunit, configured to perform coordinate transformation on the current coordinates of the plurality of reference points by utilizing the candidate transformation parameter to obtain first transformation coordinates of the plurality of reference points; an error determining subunit, configured to determine re-projection errors of the first transformation coordinates of the plurality of reference points relative to corresponding template coordinates; a screening subunit, configured to determine a first subset of the plurality of reference points, wherein reference points in the first subset have re-projection errors smaller than an error threshold; and a transformation parameter determining subunit, configured to determine the transformation parameter by utilizing current coordinates of the reference points in the first subset and template coordinates of corresponding reference points for the reference points in the first subset, in the template image.

According to some embodiments, the parameter determining unit may include: a similarity determining subunit, configured to, for each reference point of the plurality of reference points, determine a second offset between the reference point and a corresponding reference point for the reference point by utilizing the similarity between a current picture block, centered at the reference point, in the current image and a template picture block, centered at the corresponding reference point, in the template image; a screening subunit, configured to determine a second subset of the plurality of reference points based on the first offset and the second offset, wherein a difference of the first offset and the second offset of reference points in the second subset is smaller than a difference threshold; and a transformation parameter determining subunit, configured to determine the transformation parameter by utilizing current coordinates of the reference points in the second subset and template coordinates of corresponding reference points for the reference points in the second subset, in the template image.

According to some embodiments, the obstacle position determining unit may include: a first coordinate determining subunit, configured to determine a first coordinate of the obstacle object in the current image; a second coordinate determining subunit, configured to transform the first coordinate of the obstacle object based on the transformation parameter to obtain a second coordinate of the obstacle object; and a world coordinate determining subunit, configured to determine the position of the obstacle in the world coordinate system based on the second coordinate of the obstacle object.

By using the apparatus provided by the present disclosure, the transformation between the current image acquired by the roadside device and the template image acquired by the roadside device by utilizing the offline external parameters may be determined by utilizing the plurality of reference points in the images, thereby conveniently correcting errors caused by change of the external parameters of the roadside device due to external environments, and then, eliminating adverse effects brought for the position detection of the obstacle in the acquired images due to the fact that the external parameters change.

According to an embodiment of the present disclosure, further provided is an electronic device, including: at least one processor; and a memory in communication connection with the at least one processor. The memory stores an instruction executable for the at least one processor, and the instruction is executed by the at least one processor, so that the at least one processor is enabled to execute the method as mentioned in combination with FIG. 1 to FIG. 6.

According to an embodiment of the present disclosure, further provided is a roadside device, including the electronic device as mentioned previously.

According to an embodiment of the present disclosure, further provided is a cloud control platform, including the electronic device as mentioned previously.

According to an embodiment of the present disclosure, further provided is a non-transitory computer-readable storage medium storing a computer instruction, wherein the computer instruction is used to enable a computer to execute the method as mentioned in combination with FIG. 1 to FIG. 6.

According to an embodiment of the present disclosure, further provided is a computer program product, including a computer program, wherein when the computer program is executed by a processor, the method as mentioned in combination with FIG. 1 to FIG. 6 is implemented.

Figure 10:
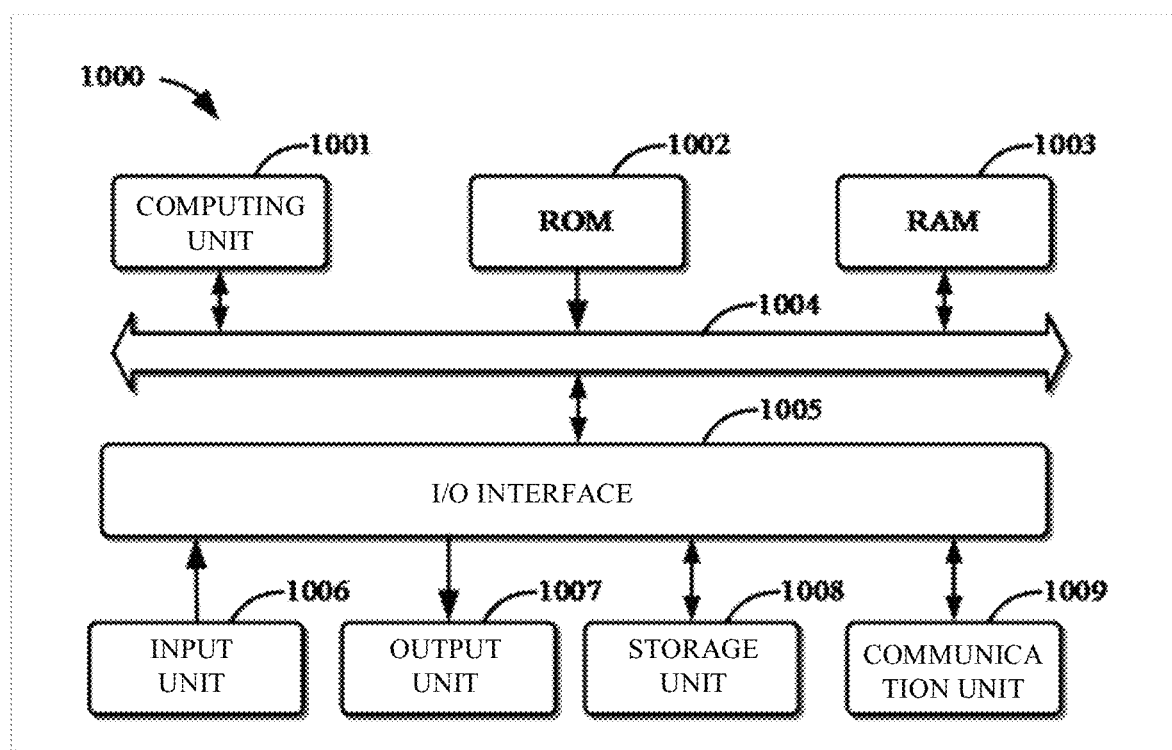
FIG. 10 shows a structural block diagram of an example electronic device capable of being used to achieve an embodiment of the present disclosure.

Referring to FIG. 10, a structural block diagram of an electronic device 1000 which may be used as a mobile terminal of the present disclosure will be described from now on, and it is an example of a hardware device which may be applied to various aspects of the present disclosure. The electronic device is intended to represent various forms of digital-electronic computer devices such as a laptop computer, a desk computer, a worktable, a personal digital assistant, a server, a blade server, a large-scale computer and other suitable computers. The electronic device may also represent various forms of mobile devices such as a personal digital assistant, a cell phone, a smart phone, a wearable device and other types of computing apparatuses. Components as shown herein, their connection and relationship as well as their functions are only used as examples, and are not intended to limit the implementations, described and/or claimed herein, of the present disclosure.

As shown in FIG. 10, the device 1000 includes a computing unit 1001 which may execute various appropriate actions and processing according to a computer program stored in a read only memory (ROM) 1002 or a computer program loaded from a storage unit 1008 to a random access memory (RAM) 1003. In the RAM 1003, various programs and data required for operation of the device 1000 may also be stored. The computing unit 1001, the ROM 1002 and the RAM 1003 are connected with one another by a bus 1004. An input/output (I/O) interface 1005 is also connected to the bus 1004.

A plurality of components, including an input unit 1006, an output unit 1007, the storage unit 1008 and a communication unit 1009, in the device 1000 are connected to the input/output (I/O) interface 1005. The input unit 1006 may be any type of device capable of inputting information to the device 1000. The input unit 1006 may receive input figure or character information and generate key signal input related to user setting and/or functional control of the electronic device, and may include, but is not limited to a mouse, a keyboard, a touch screen, a track pad, a trackball, an operating lever, a microphone and/or a remote controller. The output unit 1007 may be any type of device capable of representing information and may include, but is not limited to a display, a loudspeaker, a video/audio output terminal, a vibrator and/or a printer. The storage unit 1008 may include, but is not limited to a magnetic disk and an optical disk. The communication unit 1009 allows the device 1000 to exchange information/data with other devices by utilizing a computer network such as internet, and/or various telecommunication networks, and may include, but is not limited to a modem, a network card, an infrared communication device, a wireless communication transceiver and/or a chip set, such as a Bluetooth™ device, a 1302.11 device, a WiFi device, a WiMax device, a cellular communication device and/or analogues thereof.

The computing unit 1001 may be various general-purpose or special-purpose processing components with processing and computing capacities. Some examples of the computing unit 1001 include, but are not limited to a central processing unit (CPU), a graphic processing unit (GPU), various special-purpose artificial intelligent (AI) computing chips, various computing units for running machine learning model algorithms, a digital signal processor (DSP), and any appropriate processor, controller and microcontroller. The computing unit 1001 performs all the methods and processing described above, such as the method for detecting the obstacle according to the embodiment of the present disclosure. For example, in some embodiments, the detection of the obstacle may be implemented as a computer software program which is visibly included in a machine-reachable medium such as the storage unit 1008. In some embodiments, part or all of the computer program may be loaded and/or installed on the device 1000 by utilizing the ROM 1002 and/or the communication unit 1009. When the computer program is loaded on the RAM 1003 and is executed by the computing unit 1001, one or more steps of the method described above may be performed. Alternatively, in other embodiments, the computing unit 1001 may be configured to execute, in any other appropriate manners, the method for detecting the obstacle.

Various implementations of the above system and technology described herein may be implemented in a digital electronic circuit system, an integrated circuit system, a field-programmable gate array (FPGA), an application-specific integrated circuit (ASIC), an application-specific standard product (ASSP), a system of a system on chip (SOC), a complex programmable logic device (CPLD), computer hardware, firmware, software, and/or their combinations. The various implementations modes may include implementation in one or more computer programs, the one or more computer programs may be executed and/or explained on a programmable system including at least one programmable processor, the programmable processor may be a special-purpose or general-purpose programmable processor, and may receive data and instructions from a storage system, at least one input apparatus and at least one output apparatus and transmit data and instructions to the storage system, the at least one input apparatus and the at least one output apparatus.

Program codes for implementing the method provided by the present disclosure may be compiled by adopting any combinations of one or more programming languages. These program codes may be provided to a processor or controller of a general-purpose computer, a specific-purpose computer or other programmable data processing apparatuses, so that functions and/or operations specified in the flow diagrams and/or block diagrams are implemented when the program codes are executed by the processor or the controller. The program codes may be completely executed on a machine, partially executed on the machine, partially executed as an independent software packet on the machine and partially executed on a remote machine, or completely executed on the remote machine or a server.

In the context of the present disclosure, the machine-readable medium may be a tangible medium which may include or store programs to be used by an instruction execution system, apparatus or device or to be used by the instruction execution system, apparatus or device in combination. The machine-readable medium may be a machine-readable signal medium or a machine-readable storage medium. The machine-readable medium may include, but is not limited to electronic, magnetic, optical, electromagnetic, infrared or semiconductor system, apparatus or device, or any appropriate combination of the above. More specific examples of the machine-readable storage medium may include electric connection based on one or more lines, a portable computer disk, a hard disk, a random access memory (RAM), a read-only memory (ROM), an electrically programmable read-only memory (EPROM or flash memory), an optical fiber, a portable compact disc read-only memory (CD-ROM), an optical storage device, a magnetic storage device, or any appropriate combination of the above.

In order to provide interaction with a user, the system and technology described herein may be implemented on a computer. The computer is provided with a display apparatus (such as a CRT (Cathode Ray Tube) or an LCD (Liquid Crystal Display) monitor) for displaying information to the user; and a keyboard and a pointing apparatus (such as a mouse or a trackball), wherein the user may provide input to the computer by the keyboard and the pointing apparatus. Other kinds of apparatuses may also be used for providing interaction with the user. For example, a feedback provided to the user may be any form of sensory feedback (such as a visual feedback, an auditory feedback or a tactile feedback). Moreover, the input from the user may be received in any manner (including sound input, voice input or tactile input).

The system and technology described herein may be implemented in a computing system (such as a data server) including a background component, or a computing system (such as an application server) including a middleware component, or a computing system (such as a user computer provided with a graphical user interface or a web browser, wherein a user may interact, by utilizing the graphical user interface or the web browser, with the implementations of the system and the technology described herein) including a front end component, or a computing system including any combinations of the background component, the middleware component or the front end component. The components of the system may be interconnected by digital data communication in any manner or medium (such as a communication network). Examples of the communication network include a local area network (LAN), a wide area network (WAN) and an Internet.

The computer system may include a client and a server. The client and the server are generally far away from each other and generally interact through the communication network. A relationship between the client and the server is generated by a computer program running on a corresponding computer and having a client-server relationship.

It should be understood that the steps can be re-ordered, added or deleted using the various forms of processes shown as above. For example, all the steps recorded in the present disclosure can be performed concurrently or in order or according to different orders if only a result expected by the disclosed technical solutions of the present disclosure can be achieved, which is not limited herein.

Although the embodiments or examples of the present disclosure have been described with reference to the accompanying drawings, it should be understood that the above-mentioned method, system and device are only example embodiments or examples, the scope of the present disclosure is limited by the authorized claims and an equivalent scope thereof, rather than these embodiments or examples. The various elements in the embodiments or examples can be omitted or substituted with equivalent elements. In addition, all the steps can be performed according to an order different from that described in the present disclosure. Further, the various elements in the embodiments or examples can be combined in various manners. Importantly, as a technology has evolved, many elements described herein can be substituted with equivalent elements appearing later than the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for detecting an obstacle, the method comprising:
    acquiring, by a processor, a current image, wherein the current image comprises an obstacle object representing an obstacle located on a predetermined plane;
    determining, by the processor, a transformation parameter between the current image and a template image based on current coordinates of a plurality of reference points on the predetermined plane in the current image and template coordinates of corresponding reference points for the plurality of reference points in the template image; and
    determining, by the processor, a position of the obstacle in a world coordinate system utilizing the transformation parameter and pixel coordinates of the obstacle object in the current image;
    wherein determining the transformation parameter comprises:
        determining the current coordinates of the plurality of reference points in the current image based on the template image, the current image, and the template coordinates of the corresponding reference points in the template image; and
        determining the transformation parameter based on a transformation between the current coordinates of the plurality of reference points in the current image and the template coordinates of the corresponding reference points in the template image; and
    wherein determining the current coordinates of the plurality of reference points in the current image comprises:
        determining a first offset for each reference point of the plurality of reference points in the current image relative to a corresponding reference point of the corresponding reference points in the template image using an optical flow tracking method; and
        determining a current coordinate of the reference point in the current image based on the first offset of the reference point and a template coordinate of the corresponding reference point in the template image.

2. The method according to claim 1, wherein determining the transformation parameter based on the transformation comprises:
    determining a candidate transformation parameter utilizing the current coordinates of the plurality of reference points and the template coordinates of the corresponding reference points;
    performing coordinate transformation on the current coordinates of the plurality of reference points utilizing the candidate transformation parameter to obtain first transformation coordinates of the plurality of reference points;
    determining re-projection errors of the first transformation coordinates of the plurality of reference points relative to corresponding ones of the template coordinates of the corresponding reference points;
    determining a first subset of the plurality of reference points, wherein reference points in the first subset have re-projection errors smaller than an error threshold; and
    determining the transformation parameter utilizing current coordinates of the reference points in the first subset and template coordinates of corresponding reference points for the reference points in the first subset in the template image.

3. The method according to claim 1, wherein determining the transformation parameter comprises:
    for each reference point of the plurality of reference points in the current image, determining a second offset between the reference point and a corresponding reference point of the corresponding reference points in the template image utilizing a similarity between a current picture block, centered at the reference point, in the current image and a template picture block, centered at the corresponding reference point, in the template image;
    determining a second subset of the plurality of reference points based on the first offset and the second offset, wherein a difference of the first offset and the second offset of each reference point in the second subset is smaller than a difference threshold; and
    determining the transformation parameter utilizing current coordinates of the reference points in the second subset and template coordinates of corresponding reference points for the reference points in the second subset in the template image.

4. The method according to claim 1, wherein the transformation parameter comprises a homographic matrix.

5. The method according to claim 1, wherein determining the position of the obstacle in the world coordinate system comprises:
    determining a first coordinate of the obstacle object in the current image;
    transforming the first coordinate of the obstacle object based on the transformation parameter to obtain a second coordinate of the obstacle object; and
    determining the position of the obstacle in the world coordinate system based on the second coordinate of the obstacle object.

6. The method according to claim 5, wherein determining the position of the obstacle in the world coordinate system based on the second coordinate of the obstacle object comprises:
    determining a position of the obstacle in a camera coordinate system based on the second coordinate of the obstacle object utilizing an equation indicative of the predetermined plane in the camera coordinate system; and
    determining the position of the obstacle in the world coordinate system based on the position of the obstacle in the camera coordinate system.

7. The method according to claim 1, wherein the obstacle comprises at least one selected from a group consisting of a pedestrian and a vehicle.

8. The method according to claim 1, wherein each reference point of the plurality of reference points comprises one selected from a group consisting of an angular point of a lane line, a stop line, and a turning marker line.

9. An electronic device, comprising:
    at least one processor; and a memory in communication connection with the at least one processor, wherein the memory stores instructions executable by the at least one processor to perform a method comprising:
  acquiring a current image, wherein the current image comprises an obstacle object representing an obstacle located on a predetermined plane;
  determining a transformation parameter between the current image and a template image based on current coordinates of a plurality of reference points on the predetermined plane in the current image and template coordinates of corresponding reference points for the plurality of reference points in the template image; and
  determining a position of the obstacle in a world coordinate system utilizing the transformation parameter and pixel coordinates of the obstacle object in the current image;
wherein determining the transformation parameter comprises:
  determining the current coordinates of the plurality of reference points in the current image based on the template image, the current image, and the template coordinates of the corresponding reference points in the template image; and
  determining the transformation parameter based on a transformation between the current coordinates of the plurality of reference points in the current image and the template coordinates of the corresponding reference points in the template image; and
wherein determining the current coordinates of the plurality of reference points in the current image comprises:
  determining a first offset for each reference point of the plurality of reference points in the current image relative to a corresponding reference point of the corresponding reference points in the template image using an optical flow tracking method; and
  determining a current coordinate of the reference point in the current image based on the first offset of the reference point and a template coordinate of the corresponding reference point in the template image.

10. The electronic device according to claim 9, wherein determining the transformation parameter based on the transformation comprises:
  determining a candidate transformation parameter utilizing the current coordinates of the plurality of reference points and the template coordinates of the corresponding reference points;
  performing coordinate transformation on the current coordinates of the plurality of reference points utilizing the candidate transformation parameter to obtain first transformation coordinates of the plurality of reference points;
  determining re-projection errors of the first transformation coordinates of the plurality of reference points relative to corresponding ones of the template coordinates of the corresponding reference points;
  determining a first subset of the plurality of reference points, wherein reference points in the first subset have re-projection errors smaller than an error threshold; and
  determining the transformation parameter utilizing current coordinates of the reference points in the first subset and template coordinates of corresponding reference points for the reference points in the first subset in the template image.

11. The electronic device according to claim 9, wherein determining the transformation parameter comprises:
  for each reference point of the plurality of reference points in the current image, determining a second offset between the reference point and a corresponding reference point of the corresponding reference points in the template image utilizing a similarity between a current picture block, centered at the reference point, in the current image and a template picture block, centered at the corresponding reference point, in the template image;
  determining a second subset of the plurality of reference points based on the first offset and the second offset, wherein a difference of the first offset and the second offset of each reference point in the second subset is smaller than a difference threshold; and
  determining the transformation parameter utilizing current coordinates of the reference points in the second subset and template coordinates of corresponding reference points for the reference points in the second subset in the template image.

12. The electronic device according to claim 9, wherein the transformation parameter comprises a homographic matrix.

13. The electronic device according to claim 9, wherein determining the position of the obstacle in the world coordinate system comprises:
  determining a first coordinate of the obstacle object in the current image;
  transforming the first coordinate of the obstacle object based on the transformation parameter to obtain a second coordinate of the obstacle object; and
  determining the position of the obstacle in the world coordinate system based on the second coordinate of the obstacle object.

14. A roadside device, comprising the electronic device according to claim 9.

15. A cloud control platform, comprising the electronic device according to claim 9.

16. A non-transitory computer-readable storage medium storing instructions that, when executed by at least one processor, cause the at least one processor to perform operations comprising:
  acquiring a current image, wherein the current image comprises an obstacle object representing an obstacle located on a predetermined plane;
  determining a transformation parameter between the current image and a template image based on current coordinates of a plurality of reference points on the predetermined plane in the current image and template coordinates of corresponding reference points for the plurality of reference points in the template image; and
  determining a position of the obstacle in a world coordinate system utilizing the transformation parameter and pixel coordinates of the obstacle object in the current image;
wherein determining the transformation parameter comprises:
  determining the current coordinates of the plurality of reference points in the current image based on the template image, the current image, and the template coordinates of the corresponding reference points in the template image; and
  determining the transformation parameter based on a transformation between the current coordinates of the plurality of reference points in the current image and the template coordinates of the corresponding reference points in the template image; and wherein determining the current coordinates of the plurality of reference points in the current image comprises:

determining a first offset for each reference point of the plurality of reference points in the current image relative to a corresponding reference point of the corresponding reference points in the template image using an optical flow tracking method; and determining a current coordinate of the reference point in the current image based on the first offset of the reference point and a template coordinate of the corresponding reference point in the template image.

* * * * *